US006480325B1

(12) United States Patent
Batchko et al.

(10) Patent No.: US 6,480,325 B1
(45) Date of Patent: Nov. 12, 2002

(54) LASER LIGHT SOURCE AND IMAGE DISPLAY BASED ON QUASI-PHASEMATCHED NONLINEAR OPTICAL DEVICES

(75) Inventors: Robert Batchko, Stanford, CA (US); Robert Byer, Stanford, CA (US); Uwe Kurt Bader, Bad Kreuznach (DE); Jan-Peter Meyn, Kaiserslautern (DE)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/578,994

(22) Filed: May 25, 2000

(51) Int. Cl.$^7$ .............................. G02F 1/39; G02F 1/35; G02F 1/37; H01S 3/109

(52) U.S. Cl. ........................ 359/330; 359/326; 359/328; 372/22

(58) Field of Search ................................. 359/326–332; 372/21–22

(56) References Cited

U.S. PATENT DOCUMENTS

| | | | |
|---|---|---|---|
| 5,177,633 A | 1/1993 | Wong ........................ | 359/330 |
| 5,640,405 A | 6/1997 | Wallace et al. ................ | 372/21 |
| 5,740,190 A | 4/1998 | Moulton ...................... | 372/23 |
| 5,768,302 A | 6/1998 | Wallace et al. ................ | 372/21 |
| 5,787,102 A | 7/1998 | Alexander et al. ............ | 372/22 |
| 5,828,424 A | 10/1998 | Wallenstein ................. | 348/760 |
| 5,894,489 A | 4/1999 | Halldorsson et al. ......... | 372/23 |
| 6,016,214 A | 1/2000 | Meyer, Jr. et al. .......... | 359/237 |

OTHER PUBLICATIONS

Moore et al, "Optical Parametric Oscillation with Intracavity Sum–Frequency Generation", IEEE Journal Of Quantum Electronics, vol. 29, No. 3, Mar. 1993, pp. 961–969.*

Gu et al, "Efficient Generation of Coherent Blue Light by Frequency–Tripling Single 1.32–βm Beam in Two Separate KTP and Ce:KTP Crystals", Summaries Of Papers Presented At Conference On Lasers And Electro–Optics 1999 (CLEO 99), pp. 301–302, Paper No. CWG2, May 26, 1999.*

Wallenstein, "High Power All–Solid–State Laser Source For Direct–Write Large Screen Laser Projection Displays", IEEE Lasers And Electro–Optics Society 12th Annual Meeting (LEOS '99), Paper No. TuC3, vol. 1, pp. 158–159, Nov. 1999.*

T Südmeyer et al., "Novel Ultrafast Parametric Systems: High Repetition Rate Sigle–Pass OPG And Fibre–Feedback OPO," Received Apr. 9, 2001, Published Aug. 7, 2001, J. Phys. D: Appl. Phys. 34(2001) 2433–2439.

(List continued on next page.)

*Primary Examiner*—John D. Lee
(74) *Attorney, Agent, or Firm*—Lumen Intellectual Property Services, Inc.

(57) ABSTRACT

An apparatus for generating three or more optical signals. The apparatus generally comprises a coherent source, an optical parametric generation device and a sum frequency generator. The coherent source generates a first optical signal having a first free-space wavelength. The optical parametric generation device interacts the first optical signal to produce an idler signal and a second optical signal having a second free-space wavelength while transmitting a portion of the first optical signal to the sum frequency generator. The sum frequency generator non-linearly combines part of the second portion of the first optical signal with the idler signal to produce a third optical signal characterized by a third free-space wavelength. The first, second, and third optical signals may comprise collinear red green and blue beams that may be modulated and scanned to produce an image. Furthermore, the optical parametric generation device and the sum frequency generator may be fabricated as a single monolithic device.

58 Claims, 3 Drawing Sheets

OTHER PUBLICATIONS

A. C. Chiiang et al., "Sodium Laser Generation Form A 532 NM–Pumped Periodically–Poled Lithium Niobate," Submitted to the IPC 2000, Sep. 2000, retrieved on Mar. 12, 2002. Retrieved from the internet: < URL: http://www.hc-photonics.com.tw/dragon_knowledge_sodi.htm>.

"Coherent Unveils All Solid–State Blue Laser," Aug. 2001, retrieved on Mar. 12, 2002. Retrieved from the internet: < URL: http://www.photonics.com/spectra/newprods/aug01/oridcoherent3.html>.

Ping Koy Lam et al., "Observation Of More Than 7 DB Vacuum Squeezing Form an Optical Parametric Oscillator," retrieved on Mar. 12, 2002. Retrieved from the internet: < URL: http://www.anu.edu.au/physics/qoptics/vac_sqz_ad.html >.

"Quasi Phase Matching in KTP," retrieved on Mar. 12, 2002. Retrieved from the internet: < URL: http://www.advt–inc-.com/projects/qpm.html>.

"Integrated Optics and Optical Frequency Conversion," ETH>PHYS>IQE>NLO: Annual Report 1996, retrieved on Mar. 12, 2002. Retrieved from the internet: < URL: http://www.nlo.ethz.ch/annual–reports/1996/ar96–4.html>.

Kevin J. Snell et al., "RGB Optical Parametric Oscillator Source For Compact Laser Projection Displays," retrieved on Mar. 12, 2002. Retrieved from the internet: < URL: http://www.qpeak.com/papers/aero99/aero99.htm >.

* cited by examiner

LASER LIGHT SOURCE AND IMAGE DISPLAY BASED ON QUASI-PHASEMATCHED NONLINEAR OPTICAL DEVICES

STATEMENT REGARDING FEDERALLY SPONSORED RESEARCH OR DEVELOPMENT

This invention was supported in part by grant number ONR-N00014-92-J-1903 from the Office of Naval Research (ONR) The Government has certain rights in the invention.

FIELD OF THE INVENTION

This invention relates generally to light sources. More particularly, it relates to light sources for image display systems.

BACKGROUND ART

Systems for displaying color images are based on combining typically three or more primary colors of light, such as red, blue and green. In the prior art, cathode ray tubes (CRT's) with phosphor screens provided most color images for television and computer monitors. The image is built up from a series of pixels on a phosphor screen. Each pixel on the screen contains phosphors that produce different colors of light when struck by an electron beam. Typically, red, green and blue phosphors are placed close to each other at the location of each pixel. Scanning the beam across the screen while modulating beam intensity produces color images. Although cathode ray tube technology is widely used for television and computer monitors, the electron gun that produces the electron beam requires a lot of power. The electron gun and beam must be enclosed in a vacuum tube. The deflection of the electron beam requires considerable space, which adds to the space occupied by the display. Furthermore, CRT systems for projecting images on a screen are awkward and produce inferior image quality.

Recently light emitting diodes (LEDs) have become popular for illuminating flat panel displays in laptop computers and video cameras. These displays consume less power and take up less space than cathode ray tube displays. Unfortunately, the brightness output of typical LED's is limited. Large area LED displays require large numbers of LED's, which adds to the complexity and cost of the display.

Laser based displays offer an alternative to CRTs and LEDs. A laser image display system typically comprises laser sources, modulators, combining optics and a scanner. The laser source produces one or more beams of laser light. Separate sources provide laser light having free-space wavelengths corresponding to the colors red, green and blue. The modulators vary the intensity of each beam of light to vary the color of each pixel in the image. The combining optics joins the red, green and blue beams to form a single beam. The scanner deflects the beam, which is projected onto a screen to form an image.

Such laser based image displays are more compact than CRT displays and provide better image quality. However, there are still problems. One problem has been the production of blue laser light. There are few practical laser process that produce blue laser light.

Recently, diode lasers and non-linear optical devices have become available for the production of blue light. Non-linear devices include second harmonic generators, optical parametric generators and sum frequency generators.

Second harmonic generators take two identical photons of input light and produce a single output photon having the energy of the two input photons. The output photon has twice the frequency of the input photons and, therefore, half the wavelength. A second harmonic generator may be used, for example, to take infrared light at a free-space wavelength of 1064-nm and produce green light at 532-nm. Optical parametric generators (OPGs) split an input photon into two photons having different free-space wavelengths. For example, an OPG can split a beam of green light having a free-space wavelength of 526.5-nm into two beams of infrared light having free-space wavelengths of 1240-nm and 915-nm. Generally, the shorter wavelength (i.e., higher frequency and therefore higher energy) beam is referred to as a signal and the longer wavelength beam is referred to as an idler.

Sum frequency generators take two photons having different frequencies and produce an output photon having a frequency equal to the sum of the frequencies of the two input photons. For example, a sum frequency generator could take green light having a free-space wavelength of 532-nm and combine it with infrared light having a free-space wavelength of 3.42 microns to produce blue light having a free-space wavelength of 460-nm.

Three-color laser display systems based on non-linear optical devices are described in U.S. Pat. Nos. 5,828,424 and 5,740,190. However, each of these displays requires combining optics to combine the red, blue and green beams into a single beam for projecting the image. If the combining optics do not properly align the three beams so that they are collinear, the image quality degrades.

There is a need, therefore, for an improved laser based display that overcomes the above difficulties.

OBJECTS AND ADVANTAGES

Accordingly, it is a primary object of the present invention to provide an improved laser based source of red, green and blue light. It is a further object of the invention to provide a source that generates coherent red, green, and blue light beams collinearly. It is an additional object of the invention to provide an improved laser based display system. It is a further object of the present invention provide a light source that is more efficient at producing blue light.

SUMMARY

These objects and advantages are attained by an apparatus for generating three or more optical signals. According to a first embodiment, The apparatus generally comprises a coherent source, an optical parametric generation device and a sum frequency generator. The coherent source generates a first optical signal characterized by a first free-space wavelength. The optical parametric generation device interacts with a first portion of the first optical signal to produce a second optical signal characterized by a second free-space wavelength. The optical parametric generation device also produces an idler signal and transmits a second portion of the first optical signal to the sum frequency generator. The sum frequency generator non-linearly combines part of the second portion of the first optical signal with the idler signal to produce a third optical signal characterized by a third free-space wavelength. The sum frequency generator transmits the second optical signal, the third optical signal and a remainder of the first optical signal. The second harmonic generator may be incorporated with the optical parametric device and the sum frequency generator into a single monolithic structure. The structure may include a resonant cavity to enhance the output of any or all of the three signals.

According to a second embodiment, the first, second, and third optical signals may comprise collinear red green and blue beams that may be modulated and scanned to produce an image. Furthermore, the optical parametric generation device and the sum frequency generator may be fabricated as a single monolithic device.

In an third embodiment, pump radiation from a source interacts with an optical parametric oscillator (OPO) to produce signal radiation having a desired free-space wavelength. Two second-harmonic generators then double the frequency of the signal radiation twice to produce blue light.

In a fourth embodiment pump radiation from a source interacts with an optical parametric oscillator (OPO) to produce signal radiation having a desired free-space wavelength. The pump radiation then combines with the signal radiation in a sum-frequency generator to produce blue light.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Theoretical Considerations

It is useful in understanding the invention to distinguish between Optical Parametric Generation (OPG), Optical Parametric Oscillation (OPO), and Optical Parametric Amplification (OPA) In OPG, the non-linear crystal typically receives pump radiation shaving a sufficiently high peak power that the gain of the crystal amplifies background photons. For example, pump power is large enough that the crystal gain is of the order $10^{20}$ or greater.

In OPO, a resonant cavity enhances the build-up of amplified fields. A resonant cavity generally comprises two or more reflectors that define a beam path having a certain length. The cavity resonates radiation when the path length equals an integer multiple of the free-space wavelength of the radiation. Such a cavity may resonate the pump radiation, the signal radiation, the idler radiation or some combination of any or all of these depending on the choice of cavity length.

In OPA, the OPG process is "seeded" with photons having the desired signal or idler wavelength, or possible both. The seeding process reduces the pump power required necessary to obtain a desired level of amplification. Furthermore, it there is a modulation signal on the "seed" photons, that signal will be amplified by the OPA process.

Red, Green, Blue Generation

Figure 1A:
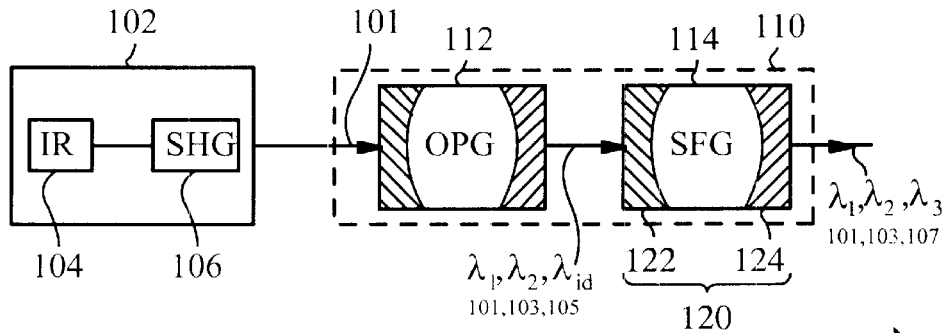
FIGS. 1A, 1B, and 1C depict simplified schematic diagrams of a multiple wavelength light source according to a first embodiment of the present invention.

FIG. 1A depicts a multiple wavelength source according to an embodiment of the present invention. The source 100 generally comprises a coherent light source 102, and a non-linear optical device 110. Light source 102 produces coherent first signal beam 101 having a free-space wavelength $\lambda_1$. Light source 102 may be any device for producing coherent light. In an exemplary embodiment, light source 102 includes an infrared laser 104 coupled to a second-harmonic generator (SHG) 106. The infrared laser produces light having a free-space wavelength twice as long as the desired free-space wavelength $\lambda_1$, SHG 106 doubles the frequency of light from infrared laser 104, thereby producing signal beam 101 of free-space wavelength $\lambda_1$. For the purposes of this application, light means any form of electromagnetic radiation including infrared, visible and ultraviolet light. Wavelength herein generally refers to the free-space wavelength of the radiation. The free space wavelength may be calculated by dividing the speed of light in free-space by the frequency of the radiation. In a particular embodiment, wavelength $\lambda_1$ corresponds to the color green. Green light typically has a free-space wavelength of between about 500-nm and about 550-nm.

First signal beam 101 couples to non-linear device 110, which includes an optical parametric generator (OPG) 112 and a sum frequency generator (SFG) 114. OPG 112 and SFG 114 may be fabricated as separate devices or as a single monolithic device from a single nonlinear crystal. Either or both of OPG 112 and SFG 114 may be fabricated as quasi-phase-matched (QPM) devices. OPG 112 transmits a portion of the first signal beam, which interacts with the remainder of the first signal beam to produce a second signal beam 103 having a free-space wavelength $\lambda_2$ and an idler beam 105 having free-space wavelength $\lambda_{id}$. In a particular embodiment of the invention, $\lambda_2$ corresponds to the color red. Red light typically has a free-space wavelength of between about 600-nm and 650-nm. The idler beam typically has a free-space wavelength in the infrared. Infrared light generally has a free-space wavelength greater than about 700-nm. The second signal 103, the idler signal 105 and the transmitted portion of the first signal 101 are all collinear as they emerge from OPG 112. Part of the transmitted portion of the first signal beam 101 couples to SFG 114 where it combines with the idler signal 105 to produce a third optical signal 107 having free-space wavelength $\lambda_3$. The second signal 103, the third signal 107 and a remainder of the first signal 101 emerge from SFG 114 as collinear beams.

Figure 1B:
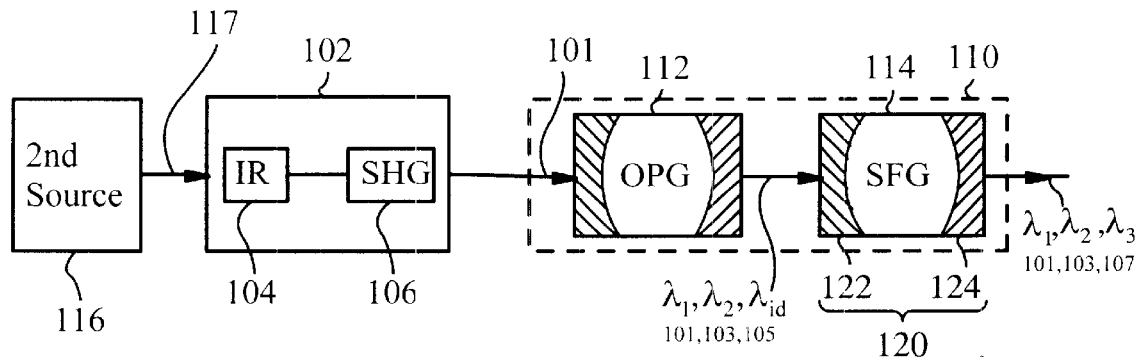
Figure 1C:
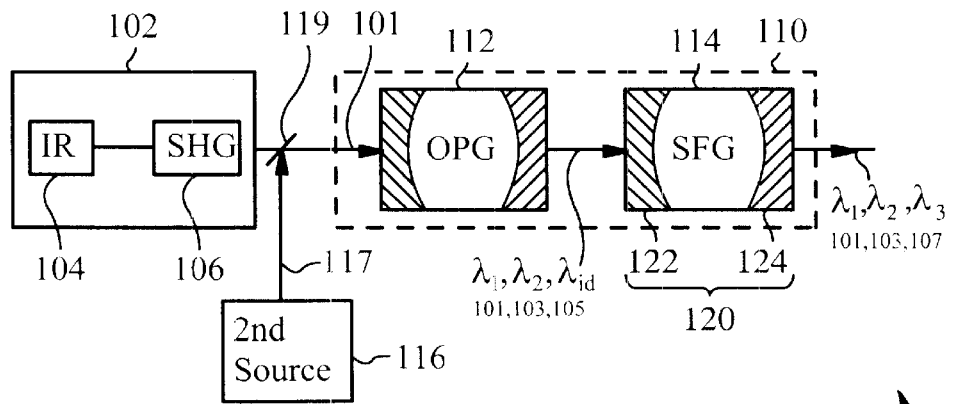

Normally, OPG 112 generates the second signal beam having free-space wavelength $\lambda_2$ and the idler signal beam having free-space wavelength $\lambda_{id}$ exponentially from background noise. In an alternative embodiment shown in FIG. 1B, the source 100 includes a secondary source 116 coupled to the OPG 112. Secondary source 116 produces light having the same frequency as the second signal $\lambda_2$ or idler signal $\lambda_{id}$. Such a secondary source 116, sometimes referred to as a "seed" source, provides seed radiation 117 that starts the optical parametric generation process at a point higher up on the exponential growth curve. As discussed above, such a process is referred to as optical parametric amplification (OPA). Seed radiation 117 may be coupled to OPG 112 by a partially transmitting reflector 119, as shown in FIG. 1C. Alternatively, secondary source 116 may be aligned such that seed radiation 117 enters source 102 along a beam path substantially coaxial to a path of first signal beam 101 entering OPG 112 (not shown).

It is possible to control the amount of green light that interacts with OPG 112 or SFG 114 by adjusting the efficiency of the non-linear process taking place in the relevant crystal. For example, the efficiency may be controlled by changing the amount of input seed power from secondary source 116, or pump power from source 102. Alternatively, applying a voltage to OPG 112 or SFG 114 can vary the efficiency of the non-linear process taking place in the relevant crystal.

Wavelength $\lambda_3$, which corresponds to the inverse of the sum of the frequencies of the idler and first signal beams, can be calculated by:

$$\lambda = \left[\frac{1}{\lambda_1} + \frac{1}{\lambda_{id}}\right]^{-1}.$$

In a particular embodiment of the invention, $\lambda_3$ corresponds to the color blue. Blue light typically has a free-space wavelength of between about 430-nm and about 500-nm.

To enhance the intensity of light at of one or more wavelengths, light source 102 or nonlinear optical device 110 may include a resonant cavity 120. For example, resonant cavity 120 is a Fabry-Perot resonator having two reflectors 122, 124 that reflect light back and forth through SFG 114. A distance L between reflectors 122, 124 determines the resonant frequency of cavity 120. By matching the resonant frequency of cavity 120 to the frequency corresponding to wavelength $\lambda_3$, the output of the third optical signal may be enhanced. The same effect may be achieved by matching the frequency of cavity 120 to a multiple or sub-multiple of the frequency corresponding to wavelength $\lambda_3$. Reflectors 122, 124 may be either planar or curved mirrors or internal reflectors. Furthermore, reflectors 122, 124 may be partially reflecting to allow light in and out of cavity 120. Although a simple Fabry-Perot cavity 120 is depicted in FIG. 1, those skilled in the art will be able to devise other geometries having three or more reflectors. Such geometries include triangle cavities, ring cavities, bowtie cavities, and the like. In addition, cavity 120 may encompass both OPG 112 and SFG 114. By suitable choice of length L, such a cavity may resonate at frequencies corresponding to $\lambda_1$, $\lambda_2$, $\lambda_3$, or $\lambda_{id}$ or any combination of these. Furthermore, it is possible to devise an apparatus having separate resonant cavities for source 102, OPG 112 and SFG 114.

Figure 2:
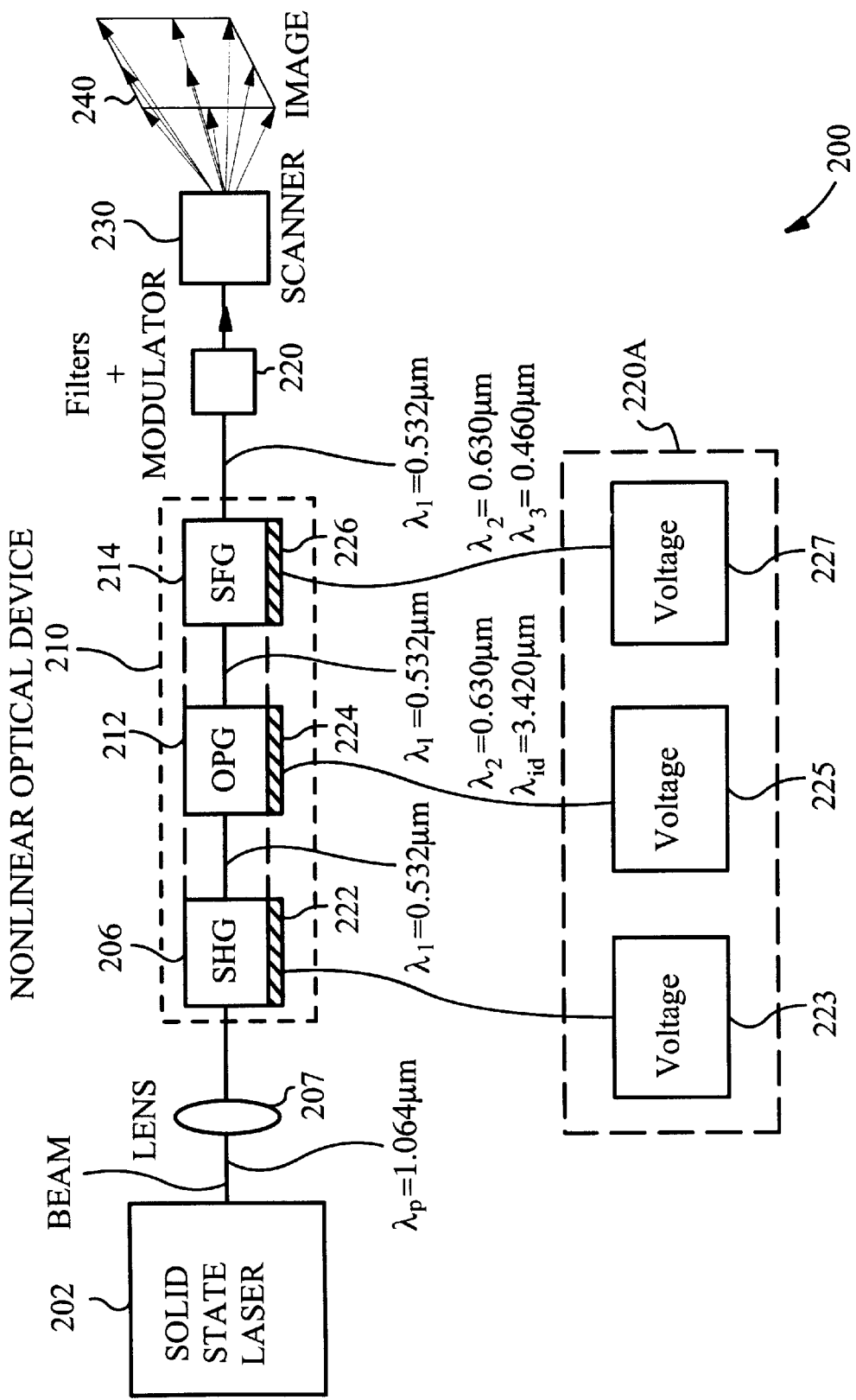
FIG. 2 depicts a simplified schematic diagram of a laser based display device according to a second embodiment of the present invention.

Three-color light sources of the type described above with respect to FIGS. 1A, 1B, and 1C may be readily incorporated into an image display, according to an alternative embodiment of the invention. FIG. 2 depicts an example of a display 200 that employs a red-green-blue laser source. The display 200 generally comprises a solid state laser 202, a nonlinear optical device 210, a modulator 220 and a scanner 230. In a specific embodiment, solid state laser 202 produces primary infrared light having a free-space wavelength $\lambda_p$=1.064 microns.

Nonlinear optical device 210 generally comprises a second harmonic generator 206, an optical parametric generator (OPG) 212, a sum-frequency generator (SFG) 214. SHG 206, OPG 212, and SFG 214 are typically fabricated from non-linear crystals. Such crystals include periodically poled structures that govern the non-linear process taking place within the crystal. Suitable non-linear materials include Lithium Niobate (LiNbO$_3$), Lithium Tantalate (LiTaO$_3$), Lithium Borate (LiBO$_3$) Periodically Poled Lithium Niobate (PPLN), Periodically Poled Lithium Tantalate (PPLT) MgO:PPLN, KTP, PPKTP, RTA, BBO, PPRTA, and the like. Suitable periodically poled structures and methods for their manufacture are described in detail in U.S. patent application Ser. No. 09/493,647, which is incorporated herein by reference for all purposes. In a particular embodiment, SHG 206, OPG 212 and SFG 214 may be manufactured as a single monolithic nonlinear optical device 210 having three different poling periods. Furthermore, any or all of SHG 206, OPG 212 and SFG 214 may be implemented as waveguide structures wherein light propagates along a thin layer. Waveguide structures are well known to those of skill in the art. Such waveguide structures allow for higher intensities and conversion efficiencies.

A lens 207 couples 1.064 micron light from laser 202 into SHG 206. The primary 1.064-micron light from laser source 202 interacts with SHG 206 to produce green light having a free-space wavelength $\lambda_1$=532-nm. The 532-nm green light interacts with OPG 212 to produce red light having $\lambda_2$=630-nm and idler light having $\lambda_{id}$=3.42=micron. The idler light and a portion of the green light interact in the SFG 214 to produce blue light having $\lambda_3$=460-nm. The red light, the blue light and the remainder of the green light are transmitted by SFG to modulator 220. Because of the serial nature of the nonlinear processes, all three beams may be co-linear as they emerge from SFG 214.

Modulator 220 varies the intensity of the three beams. Modulator 220 may include a separate unit that independently varies the intensity of each beam. For example, the red, green and blue beams may be spatially separated and each beam separately modulated by conventional means. The modulated beams may then be recombined. Alternatively, the polarization of each different beam may be separately rotated in a controllable fashion and the beams may be passed through one or more polarizers.

In an particular embodiment, a modulator 220A includes voltage sources 223, 225, 227 coupled to electrodes 222, 224, 226 proximate SHG 206, OPG 212, and SFG 214 respectively. Voltage sources 223, 225, 227 coupled and electrodes 222, 224, 226 produce electric fields within the nonlinear crystals that make up SHG 206, OPG 212, and SFG 214. The magnitudes and directions of these fields control the non-linear process taking place within SHG 206, OPG 212, and SFG 214. Therefore, independent control of voltage sources 223, 225, 227 provides independent control of the intensity of the red, green and blue light produced by display 200. Those skilled in the art will be able to devise other means of independently modulating the intensity of each of the three beams.

Scanner 230 deflects the red, green, and blue beams vertically and horizontally. Scanner 230 may comprise a mechanically actuated reflecting or refracting element. Alternatively, acousto-optic, electro-optic, or microelectro-mechanical systems (MES) components may deflect the beams to form an image. The combination of scanning and modulation produces a color image on a screen 240.

Blue Light Generation

It will be clear to one skilled in the art that the above embodiment may be altered in many ways without departing from the scope of the invention. For example, any or all of SHG 206, OPG 212, and SFG 214 may be encompassed by a resonant cavity as described above with respect to FIG. 1. Such a cavity might encompass all three devices and be configured to resonant at the frequencies of the red, green, blue, idler and pump light.

Figure 3:
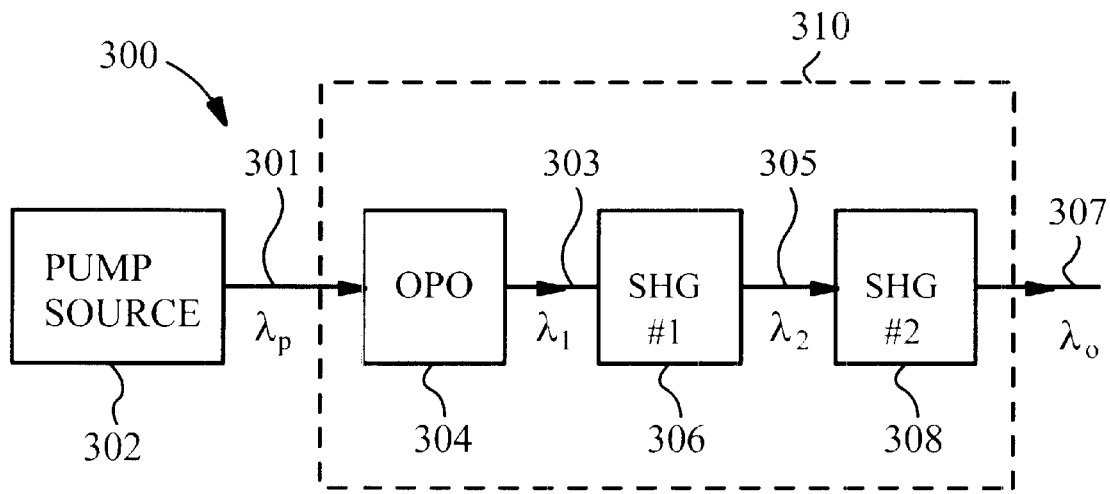
FIG. 3 depicts a simplified schematic diagram of a blue light source according to a third embodiment of the present invention.

The present teachings may also be used for light sources for producing only a single frequency of light. For example, FIG. 3 depicts a simplified schematic diagram of an apparatus for producing blue laser light according to a third embodiment of the present invention. The apparatus 300 generally comprises a pump source 302, an optical parametric oscillator 304 optically coupled to the pump source 302, a first second-harmonic generator 306 optically coupled to OPO 304 and a second second-harmonic generator 308 optically coupled to the first second-harmonic generator 306. OPO 302 and SHGs 306, 308 or any suitable combination of two of these three may be part of a monolithic device 310.

The pump source 302, e.g., a Nd:YAg laser, produces coherent pump radiation 301 at a free-space wavelength $\lambda_p$ of approximately 1064 nm. The OPO 304 interacts with pump radiation 301 to produce signal radiation 303 characterized by a free-space wavelength $\lambda_1$, e.g., of approximately 1840 nm. Of course, OPO 304 may be tuned to produce signal radiation 303 having other signal wavelengths as is well known in the art. First SHG 306 doubles the frequency of signal radiation 303 to produce an intermediate signal 305 having a free-space wavelength $\lambda_2$ half that of $\lambda_1$. For example, in the case that signal radiation 303 has a free-space wavelength $\lambda_1$ of 1840 nm, intermediate signal 305 will have a free-space wavelength $\lambda_2$ of 920 nm. Second SHG 308 then doubles the frequency of intermediate signal 305 to produce an output signal 307 having a free-space wavelength $\lambda_o$ half that of free-space wavelength $\lambda_2$. For example, in the case that intermediate signal 305 has a free-space wavelength $\lambda_2$ of 920 nm, output signal 307 has a free-space wavelength $\lambda_o$ of 460 nm, which is in the blue portion of the visible spectrum.

Figure 4:
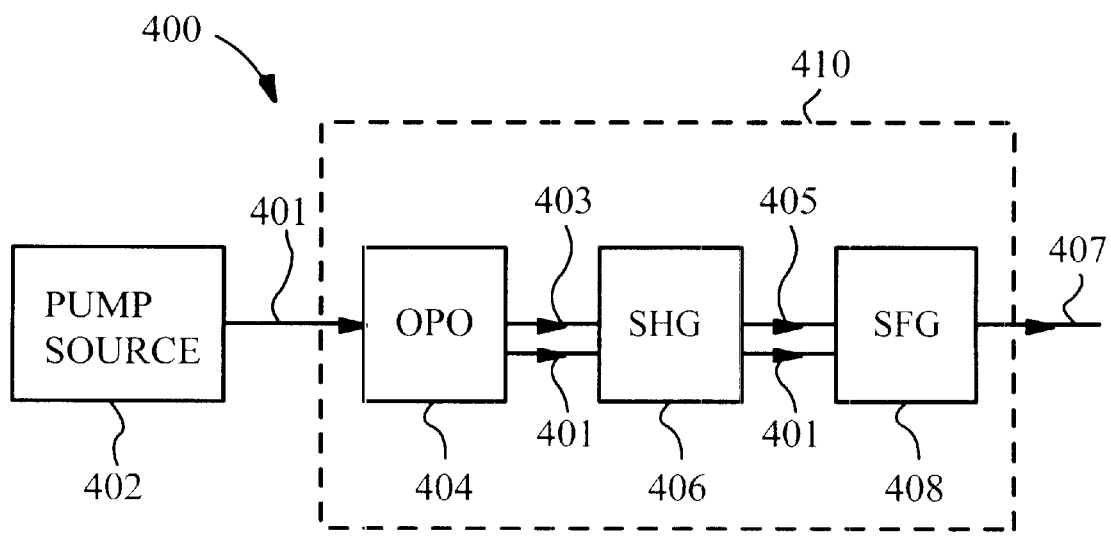
FIG. 4 depicts a simplified schematic diagram of a blue light source according to a fourth embodiment of the present invention.

There are other possible configurations for producing blue light. For example, FIG. 4 depicts a simplified schematic diagram of an apparatus for producing blue laser light according to a fourth embodiment of the present invention. The apparatus 400 generally comprises a pump source 402, an optical parametric oscillator 404 optically coupled to the pump source 402, a second-harmonic generator 406 optically coupled to OPO 404 and a sum-frequency generator (SFG) 408 optically coupled to the second-harmonic generator 406. OPO 402 SHG 406, and SFG 408 or any suitable combination of two of these three may be part of a monolithic device 410.

The pump source 402, e.g., a Nd:YAg laser, produces coherent pump radiation 401 at a free-space wavelength $\lambda_p$ of approximately 1064 nm. The OPO 404 interacts with pump radiation 401 to produce a signal radiation 403, characterized by a free-space wavelength $\lambda_1$, e.g., of approximately 1620 nm. Of course, OPO 404 may be tuned to produce signal radiation 403 having other signal wavelengths as is well known in the art. SHG 404 doubles the frequency of signal radiation 403 to produce an intermediate radiation 405 having a free-space wavelength $\lambda_2$ half that of $\lambda_1$.

For example, in the case that signal radiation 403 has a free-space wavelength $\lambda_1$ of 1620 nm, intermediate signal 405 will have a free-space wavelength $\lambda_2$ of 810 nm. SFG 408 then combines pump radiation 401 with intermediate radiation 405 to produce output radiation 407 having a frequency corresponding to the sum of the frequencies of pump radiation 401 and intermediate radiation 405. Output radiation 407 is characterized by free-space wavelength $\lambda_o$ given by:

$$\lambda_o = \left[ \frac{1}{\lambda_p} + \frac{1}{\lambda_2} \right]^{-1}$$

For example, in the case that pump radiation 401 has a free-space wavelength $\lambda_p$=1064 nm and intermediate signal 405 has a free-space wavelength $\lambda_2$ of 810 nm, output signal 407 has a free-space wavelength $\lambda_o$ of approximately 460 nm, which is in the blue portion of the visible spectrum.

Accordingly, the scope of the invention should be determined by the following claims and their legal equivalents.

What is claimed is:

1. An apparatus for generating three or more optical signals, wherein each signal has a different free-space wavelength, comprising:
   a) a coherent light source for generating a first optical signal characterized by a first free-space wavelength;
   b) an optical parametric generation device (OPG) optically coupled to the coherent light source and configured to interact with a first portion of the first optical signal to produce a second optical signal characterized by a second free-space wavelength and an idler signal while transmitting a second portion of the first optical signal; and
   c) a sum frequency generation device (SFG) optically coupled to the OPG, the SFG being configured to non-linearly combine part of the second portion of the first optical signal with the idler signal to produce a third optical signal characterized by a third free-space wavelength, wherein the SFG transmits the second optical signal, the third optical signal and a remainder of the first optical signal.

2. The apparatus of claim 1 wherein the second free-space wavelength is shorter than the first free-space wavelength.

3. The apparatus of claim 1 wherein the third free-space wavelength is shorter than the second free-space wavelength.

4. The apparatus of claim 1 wherein the OPG and the SFG comprise a single monolithic structure.

5. The apparatus of claim 1 wherein the first, second, and third optical signals comprise beams that are generated collinearly.

6. The apparatus of claim 1 wherein the coherent source includes a secondary radiation source configured to produce light at the same free-space wavelength as the idler signal or the second signal.

7. The apparatus of claim 6 further comprising one or more reflectors for optically coupling the secondary radiation source and the OPG.

8. The apparatus of claim 1 wherein at least one of the coherent light source, the OPG, and the SFG is optically coupled to one or more reflectors.

9. The apparatus of claim 1 wherein the coherent light source comprises an infrared laser coupled to a second harmonic generator (SHG), wherein the infrared laser is configured to produce light having a free-space wavelength twice as long as the first free-space wavelength.

10. The apparatus of claim 9 wherein the SHG, the OPG, and the SFG comprise a single monolithic structure.

11. The apparatus of claim 1 further comprising a modulator coupled to at least one of the coherent light source, the OPG, and the SFG.

12. The apparatus of claim 1 wherein at least one of the coherent light source, the OPG, and the SFG comprises a non-linear crystal.

13. The apparatus of claim 12 further comprising a modulating means for producing an electric field across the non-linear crystal to modulate at least one of the first, second and third optical signals.

14. The apparatus of claim 12 wherein the non-linear crystal is Lithium Niobate (LiNbO$_3$), Lithium Tantalate (LiTaO$_3$), Lithium Borate, PPLN PPLT, MgO:PPLN, KTP, PPKTP, RTA, BBO, or PPRTA.

15. The apparatus of claim 12 wherein the non-linear crystal comprises a waveguide structure.

16. The apparatus of claim 1 wherein the coherent light source comprises a solid state laser.

17. The apparatus of claim 16 wherein the solid state laser is a modulated solid state laser.

18. The apparatus of claim 1 wherein the first free-space wavelength is between approximately 500 and 600 nanometers.

19. The apparatus of claim 1 wherein the second free-space wavelength is between approximately 600 and 700 nanometers.

20. The apparatus of claim 1 wherein the first free-space wavelength is between approximately 430 and 500 nanometers.

21. An apparatus for producing red, green and blue light beams comprising:
   a) a coherent light source for producing a coherent green light beam;
   b) an optical parametric generator optically coupled to the coherent light source and configured to interact with a first portion of the green light beam to produce a red light beam and an idler light beam while transmitting a second portion of the green light beam; and
   c) a sum frequency generator optically coupled to the optical parametric generator, the sum frequency generator being configured to non-linearly combine part of the second portion of the green light beam with the idler light beam to produce a blue light beam.

22. The apparatus of claim 21 wherein the optical parametric generator and the sum frequency generator comprise a single monolithic structure.

23. The apparatus of claim 21 wherein the red, green, and blue light beams are generated collinearly.

24. The apparatus of claim 21 wherein the coherent light source includes a secondary radiation source configured to produce light having the same free-space wavelength as the idler light beam or the red light beam.

25. The apparatus of claim 24 further comprising one or more reflectors for optically coupling the secondary radiation source and the optical parametric generator.

26. The apparatus of claim 21 wherein one or more of the coherent light source, the optical parametric generator, and the sum frequency generator is optically coupled to one or more reflectors.

27. The apparatus of claim 21 wherein the coherent light source comprises a laser coupled to a second harmonic generator, wherein the laser is configured to produce a beam of light having a free-space wavelength of approximately one micron.

28. The apparatus of claim 27 wherein the second harmonic generator, the optical parametric generator, and the sum frequency generator comprise a single monolithic structure.

29. The apparatus of claim 21 further comprising a modulator coupled to at least one of the coherent light source, the optical parametric generator, and the sum frequency generator.

30. The apparatus of claim 21 wherein at least one of the coherent light source, the optical parametric generator and the sum frequency generator comprises a non-linear crystal.

31. The apparatus of claim 30 further comprising a modulating means for producing an electric field across the non-linear crystal to modulate at least one of the red, green and blue light beams.

32. The apparatus of claim 30 wherein the non-linear crystal is Lithium Niobate (LiNbO3), Lithium Tantalate (LiTaO3), Lithium Borate (LiBO3) PPLN, PPLT, MgO:PPLN, KTP, PPKTP, RTA, BBO, or PPRTA.

33. The apparatus of claim 30 wherein the non-linear crystal comprises a waveguide structure.

34. The apparatus of claim 21 wherein the coherent light source comprises a solid state laser.

35. A method for generating three or more optical signals, wherein each signal has a different free-space wavelength, comprising:
   a) generating a coherent first optical signal characterized by a first free-space wavelength;
   b) interacting a first portion of the first optical signal with an optical parametric generator to produce a second optical signal characterized by a second free-space wavelength and an idler signal characterized by an idler free-space wavelength while transmitting a second portion of the first optical signal; and
   c) non-linearly combining part of the second portion of the first optical signal with the idler signal in a sum-frequency generator to produce a third optical signal characterized by a third free-space wavelength.

36. The method of claim 35 wherein the second free-space wavelength is shorter than the first free-space wavelength.

37. The method of claim 35 wherein the third free-space wavelength is shorter than the second free-space wavelength.

38. The method of claim 35 wherein b) and c) occur in a single monolithic structure.

39. The method of claim 35 wherein the first, second, and third optical signals comprise beams that are generated collinearly.

40. The method of claim 35 wherein the first optical signal is generated by a coherent light source that includes a secondary radiation source configured to produce light having the same free-space wavelength as the idler signal or the second optical signal.

41. The method of claim 35 further comprising resonantly enhancing at least one of the first, second, third and idler signals.

42. The method of claim 35 further comprising modulating at least one of the first, second, third and idler signals.

43. The method of claim 35 wherein one or more of a), b) and c) utilizes a non-linear crystal.

44. The method of claim 43 further comprising producing an electric field across the non-linear crystal to modulate one or more of the first, second and third optical signals.

45. The method of claim 43 wherein the non-linear crystal is Lithium Niobate (LiNbO$_3$), Lithium Tantalate (LiTaO$_3$), Lithium Borate (LiBO$_3$) PPLN, PPLT, MgO:PPLN, KTP, PPKTP, RTA, BBO, or PPRTA.

46. The method of claim 43 wherein the non-linear crystal comprises a waveguide structure.

47. The method of claim 35 wherein the first free-space wavelength is between approximately 500 and 600 nanometers.

48. The method of claim 35 wherein the second free-space wavelength is between approximately 600 and 700 nanometers.

49. The method of claim 35 wherein the first free-space wavelength is between approximately 430 and 500 nanometers.

50. An image display system, comprising:
   a) a coherent light source for producing a coherent green light beam, wherein the coherent light source comprises a laser coupled to a second harmonic generator;
   b) an optical parametric generator optically coupled to the coherent light source and configured to interact with the green light beam to produce a red light beam and an idler light beam while transmitting a first portion of the green light beam;

c) a sum frequency generator optically coupled to the optical parametric generator, the sum frequency generator being configured to non-linearly combine part of the first portion of the green light beam with the idler light beam to produce a blue light beam;

d) a modulating means coupled to at least one of the optical parametric generation device, the second harmonic generator and the sum-frequency generator; and e) a scanning means for deflecting the red, green and blue light beams to form an image.

51. The system of claim 50 further comprising a display means for displaying the image.

52. The system of claim 50 wherein the optical parametric generator and the sum frequency generator comprise a single monolithic structure.

53. The system of claim 50 wherein the red, green, and blue light beams are generated collinearly.

54. A method for displaying an image, comprising:

a) generating a coherent green light beam;

b) interacting a first portion of the green light beam with an optical parametric generator to produce a red light beam and an infrared idler beam while transmitting a second portion of the green light beam;

c) non-linearly combining part of the second portion of the green light beam with the idler beam in a sum-frequency generator to produce a blue light beam;

d) modulating at least one of the red, green, and blue light beams; and e) scanning the red, green and blue beams to form an image.

55. An apparatus for producing blue light, comprising:

a) a coherent source for generating pump radiation;

b) an optical parametric oscillator (OPO), for interacting with a portion of the pump radiation to produce an optical signal characterized by a first free-space wavelength and an idler signal characterized by an idler free-space wavelength; and c) a first second-harmonic generation (SHG) device optically coupled to the OPO for doubling a frequency of the optical signal or idler signal to produce an intermediate radiation characterized by a second free-space wavelength; and d) a second SHG device optically coupled to the first SHG device for doubling a frequency of the intermediate radiation to produce a blue output radiation having a free-space wavelength that is half of the second free-space wavelength.

56. The apparatus of claim 55, wherein the coherent source includes a secondary radiation source configured to produce light at the same free-space wavelength as the idler signal or the second signal.

57. An apparatus for producing blue light, comprising:

a) a coherent source for generating coherent pump radiation characterized by a pump free-space wavelength;

b) an optical parametric oscillator (OPO) for interacting with a first portion of the pump radiation to produce a signal radiation characterized by a first free-space wavelength;

c) a second-harmonic generator (SHG) optically coupled to the OPO for doubling a frequency of the signal radiation to produce an intermediate radiation characterized by a second free-space wavelength that is half of the first free-space wavelength; and d) a sum-frequency generator (SFG) optically coupled to the SHG for combining the pump radiation with the intermediate radiation to produce a blue output radiation having a free-space wavelength equal to the sum of the inverses of the pump and second free-space wavelengths.

58. The apparatus of claim 57, wherein the coherent source includes a secondary radiation source configured to produce light.

* * * * *